G. M. LUDLOW.
TERRITORIAL BUSINESS CHART.
APPLICATION FILED MAR. 10, 1920.
1,395,848.
Patented Nov. 1, 1921.
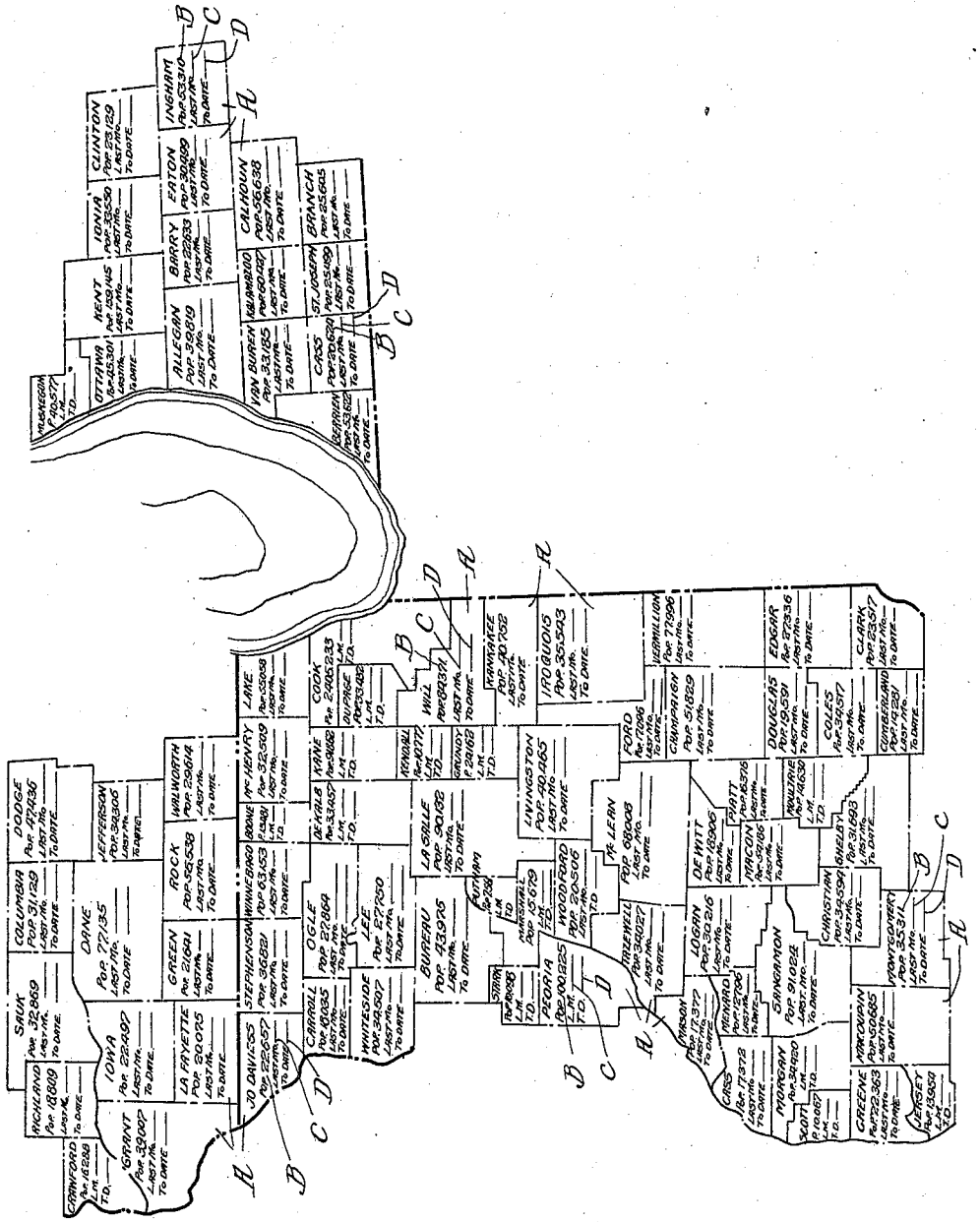
Witness:
Inventor:
George M. Ludlow

UNITED STATES PATENT OFFICE.

GEORGE M. LUDLOW, OF CHICAGO, ILLINOIS.

TERRITORIAL BUSINESS-CHART.

1,395,848. Specification of Letters Patent. Patented Nov. 1, 1921.

Application filed March 10, 1920. Serial No. 364,624.

*To all whom it may concern:*

Be it known that I, GEORGE M. LUDLOW, a citizen of the United States, residing at Chicago, in the county of Cook and State of Illinois, have invented certain new and useful Improvements in Territorial Business-Charts, of which the following is a specification.

This invention relates to a chart or form for a report or record that will indicate the amount of business transacted in the territory covered by the chart, with respect to various subdivisions of the territory, and give the information in each subdivision in its relation to the population or other existing statistics taken as an index to the amount of business possible to be done in the territory; the record being preferably in terms which indicate total business done and present rate of progress, as, for instance, by giving the total sales to the date of the record or chart, and also the amount of sales consummated during the preceding month, thereby making it possible at all times to determine whether sales in any given subdivision of territory bear the same pro rata to population as in other subdivisions, so that the chart becomes a monitor and safeguard against relaxation of effort or falling off of results in the sales department of a business in which the system is adopted.

The invention will be fully understood upon reference to the accompanying drawing, which shows an illustrative territorial chart made up of parts of three States, and constituting the general field of operation of a single district.

This field is made up of subdivisions A. These subdivisions may correspond to counties in a State, or they may be arbitrarily outlined. They contain three classes of data, namely, a number B indicating the total population of the subdivision, an indicated blank for data C to be expressive of the sales for the preceding month, and a blank for data D to be indicative of the total amount of sales to date. Thus, the data indicating business done shows total results and the results of present effort, and these are in terms which may be pro-rated to the population data with a view to determining whether or not the business in any particular subdivision is keeping up with the average business done, ascertained by pro-rating the business done in all or in a representative number of subdivisions to the total population thereof.

The chart may be used by the home office or district superintendent in keeping the various representatives in the different subdivisions of territory advised concerning the progress of work, and thus keeping up incentive and initiative, and correspondingly improving results in the selling campaign.

I claim:

A territorial business chart, comprising a graphic representation of territory corresponding to an allotted general field of business activity, and comprising spaces corresponding to subdivisions of such territory; said chart having within each subdivision space data indicative of business possibilities within the subdivision of territory represented by such space, and data indicative of business actually done in said subdivision; the last-named data being in terms which permits pro-rating with the data of business possibilities and being expressed in two factors, one of which represents total business done, while the other represents business of a present limited period of time.

Signed at Chicago, Illinois.

GEORGE M. LUDLOW.